United States Patent [19]
Bowen

[11] Patent Number: 5,890,503
[45] Date of Patent: Apr. 6, 1999

[54] SELF-CONTAINED FULLY AUTOMATIC APPARATUS FOR CLEANING EYEGLASSES

[76] Inventor: Steven J. Bowen, 5630 Crown Dr., Mira Loma, Calif. 91752

[21] Appl. No.: 106,973

[22] Filed: Jun. 29, 1998

[51] Int. Cl.$^6$ ................................................. B08B 3/10
[52] U.S. Cl. ...................... 134/102.3; 134/201; 134/199; 134/184
[58] Field of Search .................. 134/135, 199, 134/184, 186, 201, 95.3, 198, 102.3; 15/302

[56] References Cited

U.S. PATENT DOCUMENTS

| | | | |
|---|---|---|---|
| D. 354,070 | 1/1995 | Chen | D16/331 |
| 3,406,696 | 10/1968 | Machesney et al. | 134/99.1 |
| 3,480,022 | 11/1969 | Richardson et al. | |
| 4,034,432 | 7/1977 | Sullivan | 15/21 C |
| 4,157,097 | 6/1979 | Miya | 134/117 |
| 4,196,487 | 4/1980 | Marriman | 15/104 |
| 4,314,766 | 2/1982 | Lapeyre | 366/101 |
| 4,903,718 | 2/1990 | Sillivan | 134/184 |
| 5,143,101 | 9/1992 | Mor. | |
| 5,335,394 | 8/1994 | Cunningham, Jr. | 15/302 |
| 5,453,132 | 9/1995 | Kowalchuck. | |
| 5,794,635 | 8/1998 | Manies | 134/95.3 |
| 7,782,941 | 11/1988 | Freise. | |

FOREIGN PATENT DOCUMENTS

| | | | |
|---|---|---|---|
| 4209624 | 9/1993 | Germany | 134/184 |

*Primary Examiner*—Frankie L. Stinson
*Attorney, Agent, or Firm*—Goldstein & Canino

[57] ABSTRACT

A fully automatic eyeglass cleaning apparatus includes a vessel partially filled with a cleaning fluid, wherein a mechanism is included to accept and hold a pair of eyeglasses to be cleaned. The mechanism lowers the eyeglasses into the volume of fluid, and provides for a duration of vibratory cleaning activities (within the volume of fluid). Subsequently the eyeglasses are raised above the volume of fluid and are then dried by the application of directed streams of heated air that impinge upon the eyeglasses. After sufficient periods of time are provided for fluidic cleaning and drying, the eyeglasses are raised and may be removed from the mechanism by a user.

8 Claims, 5 Drawing Sheets

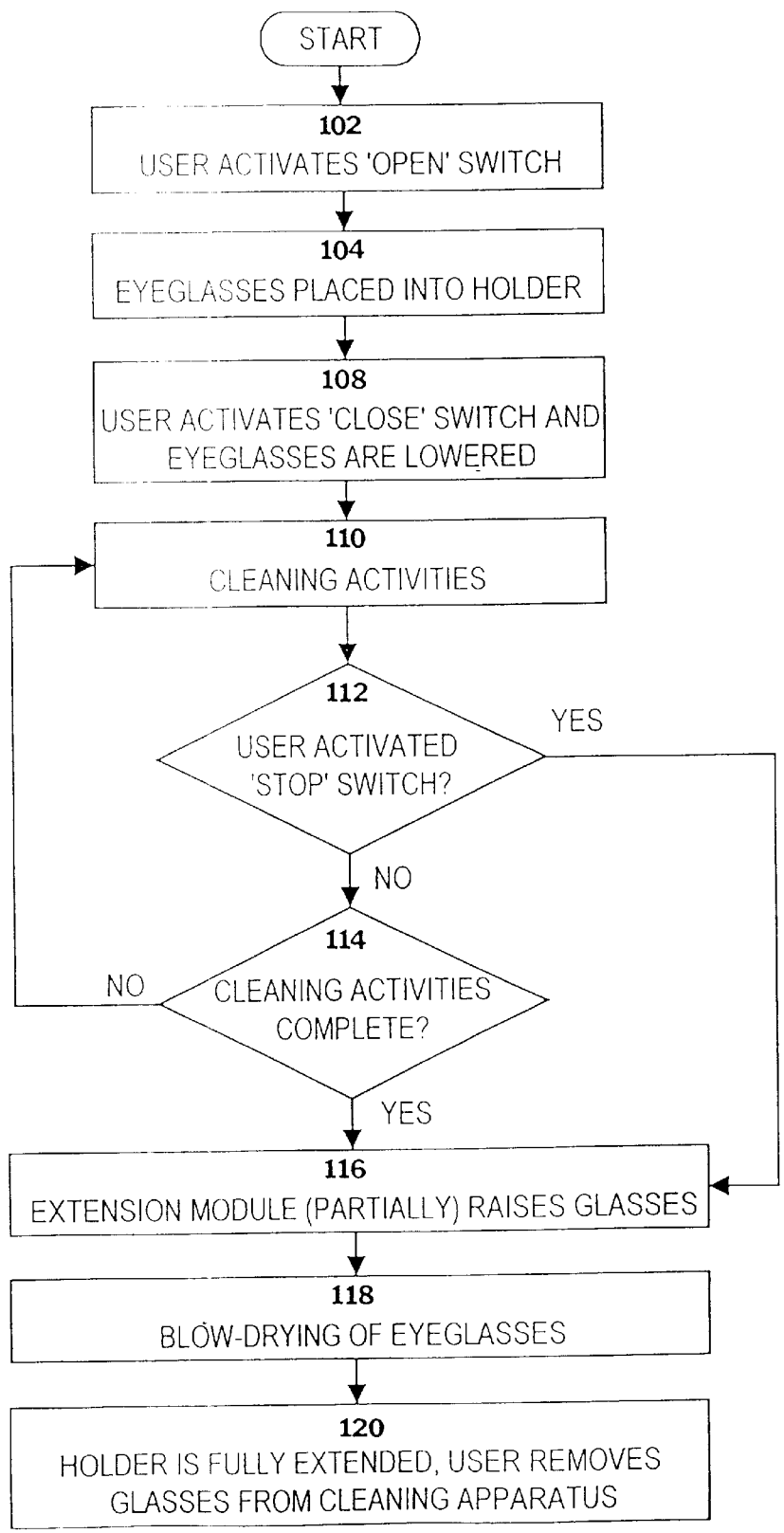

SELF-CONTAINED FULLY AUTOMATIC APPARATUS FOR CLEANING EYEGLASSES

BACKGROUND OF THE INVENTION

1. Field of the Invention

The present invention relates generally to cleaning devices. More particularly, the invention relates to a somewhat portable self-contained cleaning apparatus that cleans one or more pairs of eyeglasses in a fully automated fashion.

2. Background and Objects of the Invention

Eyeglasses are wore by a large number of persons. They may be prescription glasses, sun glasses, or worn simply for cosmetic purposes. Regardless of the function provided, all eyewear requires regular and careful cleaning. Further, as many forms of eyeglasses are provided with advanced light weight eyewear requires regular and careful cleaning. Further, as many forms of eyeglasses are provided with advanced light weight plastic lenses, scratching is a common problem that may result even with careful cleaning. It would be most desirable to provide an automated, affordable, and easy to use cleaning arrangement employable with a variety of eyewear that virtually eliminates the possibility of scratching.

When considering prior art cleaning devices, a representative example is provided by U.S. Pat. No. 4,314,766 to Lapeyre, et al. The Lapeyre invention comprises a 'Spectacle Cleaning Device' including an open-ended container that is substantially filled with a liquid detergent. The eyeglasses to be cleaned are deposited into and submerged within the container. Cleaning is effected by fluidic motion resulting from the activation by an 'agitating means'. The agitation means provides for a pressurized air source to cause a flood of bubbles to pass over the surfaces of the glasses. This device requires the user/operator to drop the eyeglasses into the container, and subsequently scoop the glasses back out—after a sufficient period of time has expired. The act of removing the glasses from the container, may in and of itself, result in the glasses being scratched or otherwise damaged. Further, this device makes no provision for drying or wiping the glasses after they are lifted from the container.

A second prior art eyeglass cleaning device is provided by U.S. Pat. No. 5,335,394 to Cunningham et al. This invention, which is somewhat complicated in structure and basic operation, provides for the mounting of the glasses so as to support an 'oscillatory motion' wherein a pair of lenses are rotated into, and back and forth within a 'fluid chamber' having a large plurality of 'resilient cleaning members' arranged to wipe and clean the glasses. The device includes a complicated housing, including a clamping arrangement to firmly support the glasses during the oscillation. Therefore, the Cunningham system requires the user to carefully 'mount' a pair of glasses before the system can be energized to commence the oscillatory cleaning motion. Also, if dirt or sand particles where to become lodged within one or more resilient cleaning members, serious damage may occur the lenses of the glasses. This invention also seems inherently expensive to manufacture.

Therefore, when considering prior art spectacle or eyeglass cleaning devices, including those discussed above, there is currently lacking a simple, very effective, scratchless, fully automatic eyeglass cleaning apparatus. Objects of the present invention are, therefore, to provide embodiments of new and improved fully automatic eyeglass cleaning apparatus having one or more of the following capabilities, features, characteristics, or advantages:

provides for the fully automatic 'contactless' cleaning and drying of at least one pair of eyeglasses;

includes means to accept and lower the eyeglasses into a cleaning vessel that is partially filled with cleaning fluid;

employs a scratch proof cleaning arrangement;

provides for the automatic (internal) blown air drying of glasses after fluidic cleaning is completed;

may be configured with a cover mechanism that may be automatically operated; and simple and relatively low cost embodiments may be constructed using a number of off-the shelf or easy to manufacture components.

The above listed objects, advantages, and associated novel features of the present invention, as well as others, will become more apparent with a careful review of the description and figures provided herein. Attention is called to the fact, however, that the drawings and the associated description are illustrative and exemplary only, and variations are certainly possible.

SUMMARY OF THE INVENTION

In accordance with the present invention a fully automatic and compact apparatus for cleaning eyeglasses includes a housing having outer wall portions forming a substantially closed shell. A cleaning vessel is provided having side wall portions and a bottom wall portion that together establish a closed bottomed (fluid holding) interior cavity. The vessel is configured with an open upper portion and is appropriately sized to readily accept at least one pair of eyeglasses. Further, the vessel is disposed within the housing so that wall portions of the vessel are substantially coextending, but inwardly, radially spaced from the outer wall portions of the housing. The housing is joined to the vessel proximate to the open upper portion of the vessel so as to form an inner, possibly somewhat annular, substantially closed compartment in-between wall portions of the vessel and the wall portions of the housing. The vessel is partially filled with a volume of cleaning fluid sufficient to accept and completely cover (or envelop) the eyeglasses.

The cleaning apparatus also includes an extension and support means, which is configured to hold and support the eyeglasses during cleaning activities, and is movable between an extended position and retracted position. The extension and support means may be arranged with a holder, which when in the extended position locates the holder above an upper end of the housing to enable a user to readily place at least one pair of eyeglasses into said holder to be supported thereby during cleaning activities. When the extension and support means is in the retracted position, the eyeglasses (and holder) are placed within the volume of cleaning fluid contained within the vessel.

To effect cleaning activities, which includes fluidic cleaning and subsequent drying, a vibration unit and a heater-blower module are provided. The vibration unit is mechanically coupled to the vessel to cause the volume of cleaning fluid to be vibrated and agitated to clean the eyeglasses. Once the eyeglasses have been cleaned, they are raised or elevated just above the volume of cleaning fluid and a heater-blower module is energized to produce a source of heated pressurized air. A plurality of jets formed in upper side wall portions of the vessel direct streams of the heated pressurized air to impinge upon and dry the eyeglasses. When being dried, the eyeglasses are suitably positioned above a surface level established by the volume of fluid, but within the vessel.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 5 a flow chart of one possible operational method that may be employed with the invention.

LIST OF REFERENCE NUMERALS USED IN THE DRAWINGS

10—eyeglass cleaning apparatus
12—housing
12a—outer wall portions (of housing)
12b—bottom wall portion (of housing)
14—(cleaning) vessel
14a—side wall portions (of vessel 14)
14b—bottom wall portion (of vessel 14)
14ab—upper side wall portions (of vessel 14)
16—interior cavity
18—volume of cleaning fluid
20—inner compartment
24—extension and support means
24a—telescoping multi-sectioned extension arm
24b—holder
28—vibration unit
30—heater-blower module
34—control unit
36—switches
40—cover mechanism
40a—(first) cover portion
40b—(second) cover portion
44—hinge means
46—(air) jets

DETAILED DESCRIPTION OF THE PREFERRED EMBODIMENTS

It is important to establish the definition of a number of terms and expressions that are used throughout this disclosure. The term 'fully automatic' as applied to the eyeglass cleaning apparatus of the present invention may be assumed to indicate that all cleaning (including drying) activities of the invention are conducted without the need for user interaction or intervention. The terms 'glasses', 'eyeglasses', and 'pair of eyeglasses' may be assumed to be equivalent and interchangeable. The term 'suspended therein', as applied to the positioning of eyeglasses within the apparatus is to be defined as appropriately positioned within a vessel that is at least partially filled with a volume of cleaning fluid, and fully covered or submerged within said fluid. Additional terms and expressions will be defined below, as required.

Figure 1A:
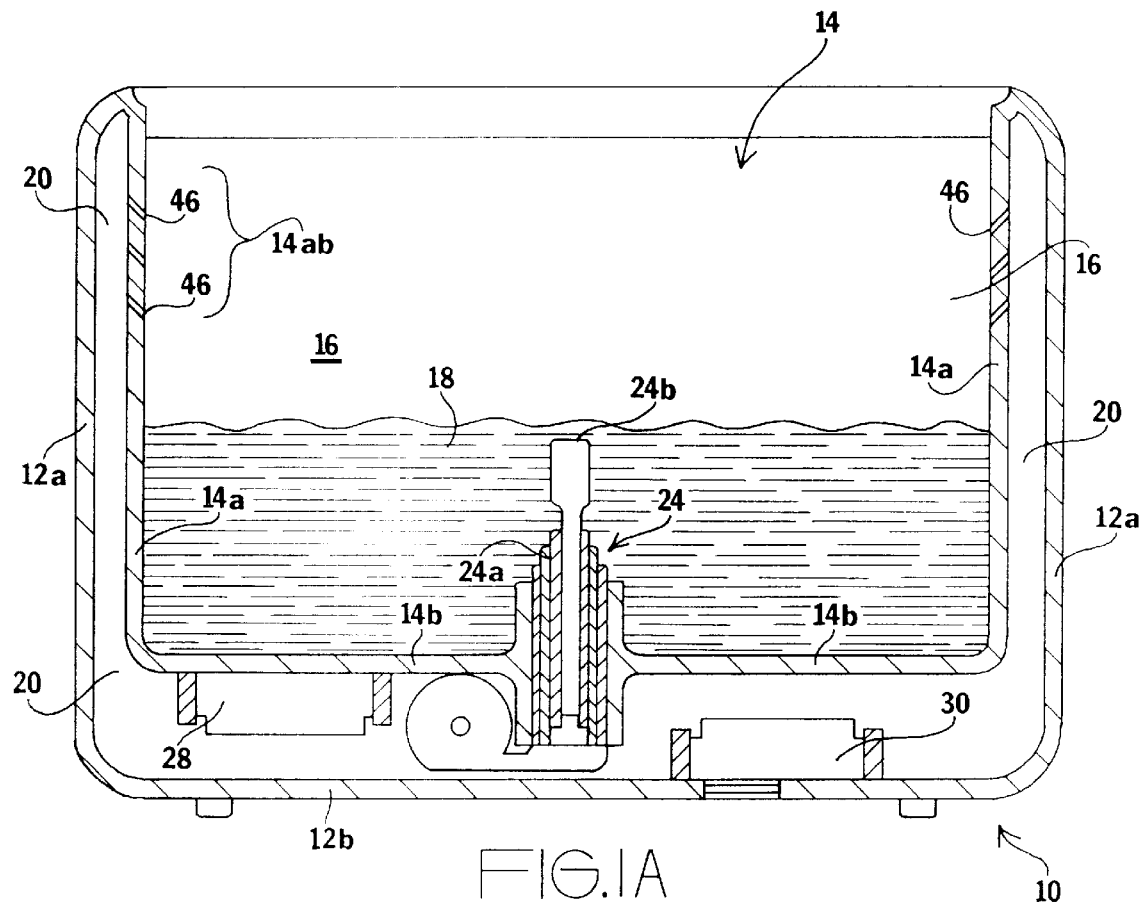
FIG. 1A provides a cross-sectional front view of a preferred embodiment in accordance with the present invention.
Figure 2:
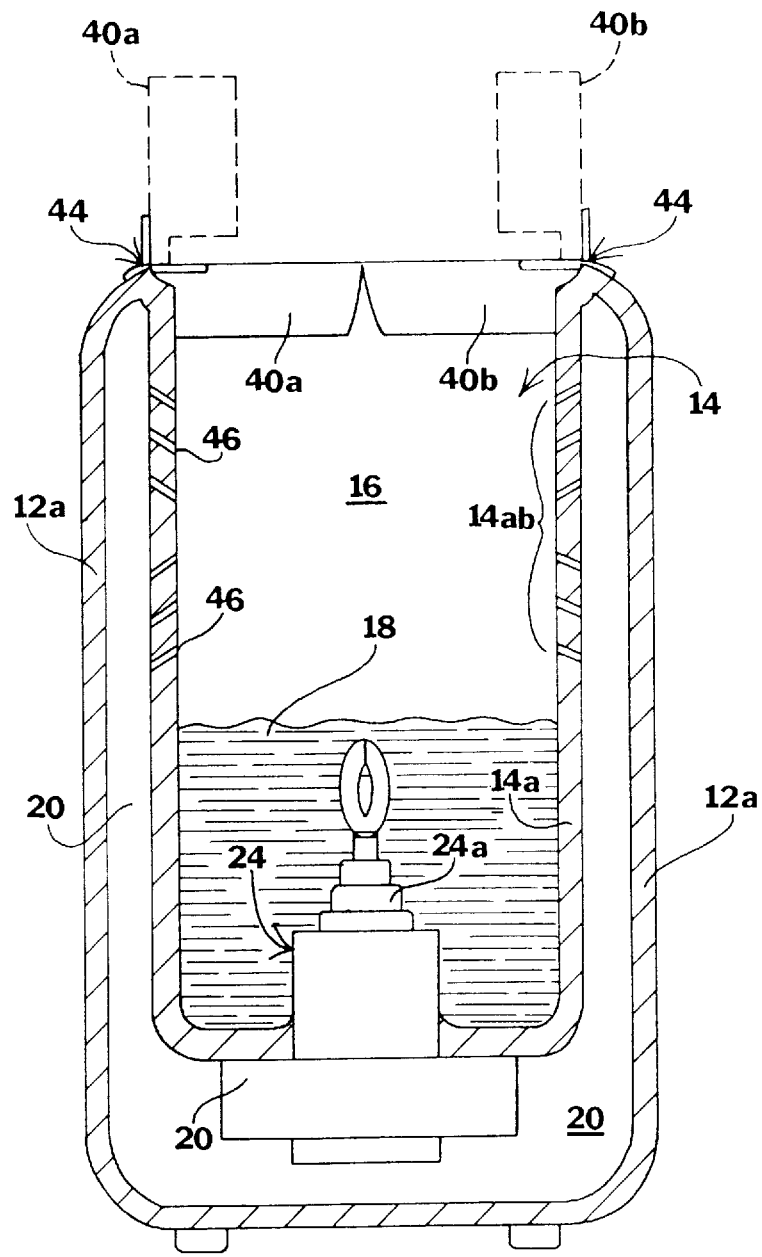
FIG. 2 depicts a side sectional view of the invention as taken along the line 2—2 of FIG. 1B.

Turning now to FIG. 1A, there is shown therein a fully automatic eyeglass cleaning apparatus 10. A housing 12 is included having outer wall portions 12a, including a bottom wall portion 12b, which are joined to form a shell or outer covering. The housing (shell) is preferably substantially closed, except as discussed below. A cleaning vessel 14 having side wall portions 14a and a bottom wall portion 14b establish an interior cavity 16. The interior cavity 16 is partially filled with a volume of cleaning fluid 18, and is partially unfilled. It is necessary for the vessel 16 to be of sufficient proportions to accommodate or readily accept at least one pair of eyeglasses to be cleaned. Further, the vessel 14 is arranged having an open upper portion and disposed within the housing 12 so that side and bottom wall portions, 14a and 14b, respectively, of the vessel 14 are substantially coextending along, and inwardly radially spaced from the outer wall portions 12a of the housing 12 (and possibly spaced from the bottom wall portion 12b also). The housing 12 is suitably joined to the vessel proximate to an open upper portion of the vessel so as to form a possibly somewhat annular, substantially closed, inner compartment 20 that is formed between wall portions 14a/14b of the vessel 14 and wall portions 12a/12b of the housing 12, as can be seen in FIGS. 1A and 2.

An important component of the cleaning apparatus 10 is an extension and support means 24, which is configured to hold and support at least one pair of eyeglasses during cleaning activities. The extension and support means 24 is arranged to be movable between a first extended position and a second retracted position, and includes a holder 24b. It may be noted that when the extension and support means 24 is in the extended position (not shown) the holder 24b is situated above (or nearly above) an upper end of the housing 12 (near and above the upper portion 14ab of the vessel 14). When in this extended position, a user may readily place at least one pair of eyeglasses into said holder 24b to be supported thereby during cleaning activities (i.e., when in the retracted position placing the eyeglasses within the volume of cleaning fluid 18 contained within the vessel 14.

The actual cleaning activities that may be employed to effect the cleaning of the eyeglasses will be fully addressed below when referring to FIG. 5. However, vibration cleaning methods, which are well known in the art, are contemplated for inclusion or use with the present invention. Accordingly, a vibration unit 28 that is suitably mechanically coupled to the vessel 14 is employed with preferred embodiments of the cleaning apparatus 10. The vibration unit 28 will cause the volume of cleaning fluid 18 (of course, including any items, such as one or more pairs of eyeglasses suspended therein) to be vibrated and be sufficiently agitated to effect cleaning. Therefore, the suspension of eyeglasses within the volume of cleaning fluid 18 for a suitable temporal period will loosen and debris, dirt, or other contaminates that are present on the eyeglasses, causing them to possibly settle to the bottom of the vessel 14. It should be noted that when referring to the cleaning of 'eyeglasses', it is intended to include both the frame and lens portions of the eyeglasses. This vibration based cleaning method, which may certainly include the use of vibrations in an ultra-sonic frequency range, provides for scratchless cleaning of even relatively soft frames and lenses fabricated of plastic or similar materials that are susceptible to easy scratching and damage when conventionally cleaned.

As the present invention provides for the fully automatic or automated cleaning (and drying) of eyeglasses, a means is required to effect the drying of the eyeglasses in a reasonably short temporal period, say within several minutes after the raised out of the volume of cleaning fluid 18. A preferred drying arrangement that may be provided with the current invention employs a heater-blower module 30 to produce a source of heated pressurized air within the closed compartment when the heater-blower module 30 is energized. The pressurized heater air is coupled to a plurality of jets 46 formed in the upper side wall portions 14ab of the vessel 14 that direct streams of pressurized heated air into the interior cavity 16 of the vessel that impinge upon the eyeglasses. Accordingly, the directed air is communicated from the compartment 20 to the interior cavity 16 to effectively 'blow-dry' the eyeglasses. It must be understood that the drying portion of the cleaning activities occurs with the extension and support means 24 in a 'suitable position' in-between the extended position and retracted position. Accordingly, in a most preferred embodiment of the invention, the 'suitable position' would locate the eyeglasses being cleaned above and outside of the volume of fluid 18, but still within the vessel. This is to be contrasted with the extended position wherein the holder 24b of the extension and support means 24, and the eyeglasses supported therein, are situated (possibly slightly) above and outside of the interior cavity 16. A possibly most preferred embodiment of the extension and support means 24, which can be best seen in FIGS. 1A and 2, includes a telescoping multi-sectioned extension arm 24a, which may be activated to raise and lower the holder 24b, as is required for the operation of the cleaning apparatus 10. As skilled persons will appreciate, the use of a telescoping sectioned extension arm 24a represents one of many suitable arrangements that may be employed to raise and lower the holder 24b and one or more pairs of eyeglasses to be cleaned.

Figure 1B:
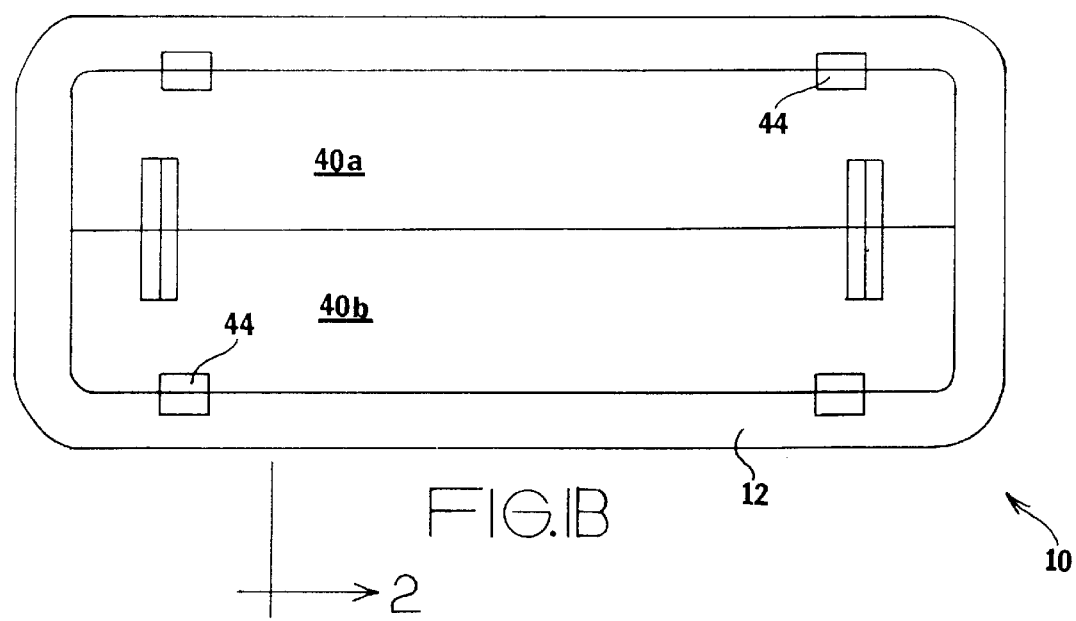
FIG. 1B illustrates a full, non-sectional top view of the embodiment shown in FIG. 1A.
Figure 3:
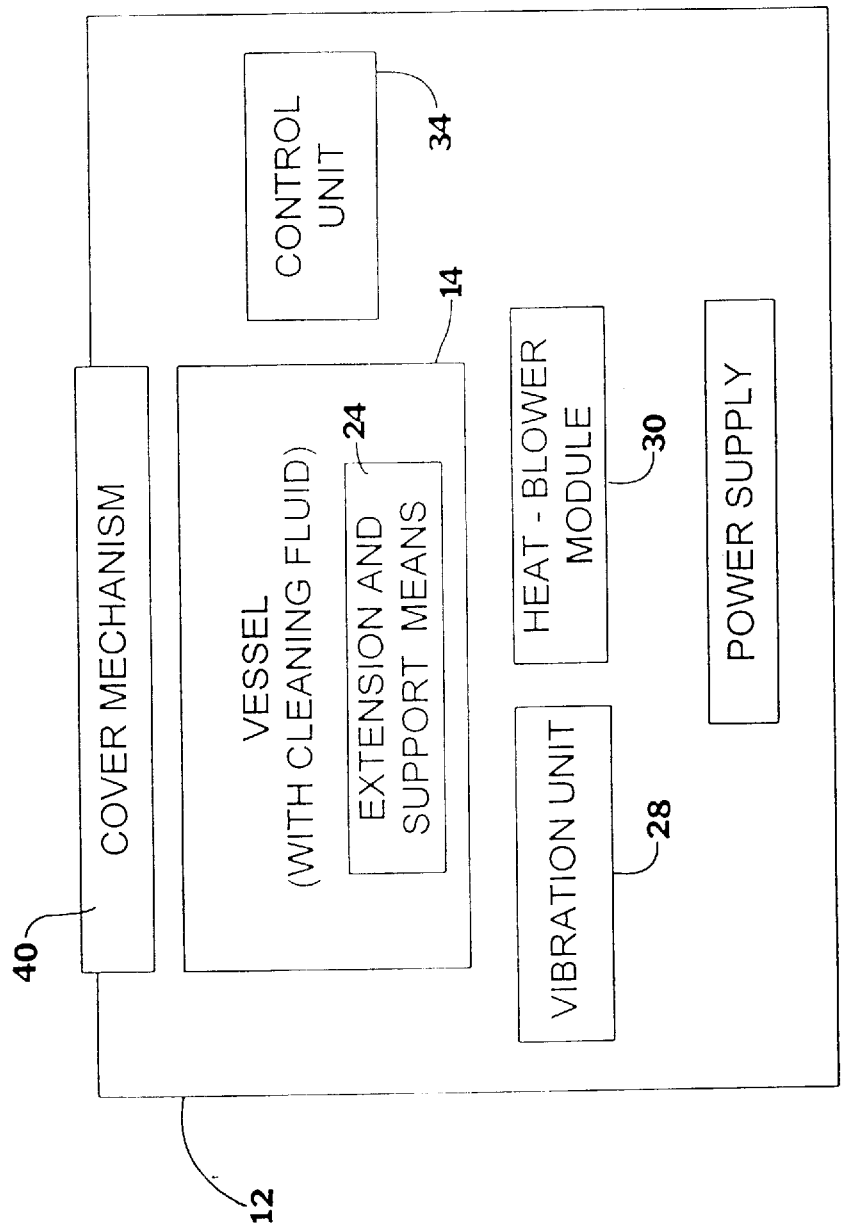
FIG. 3 illustrates a conceptual high-level block diagram of major components in a preferred embodiment of the present invention.
Figure 4:
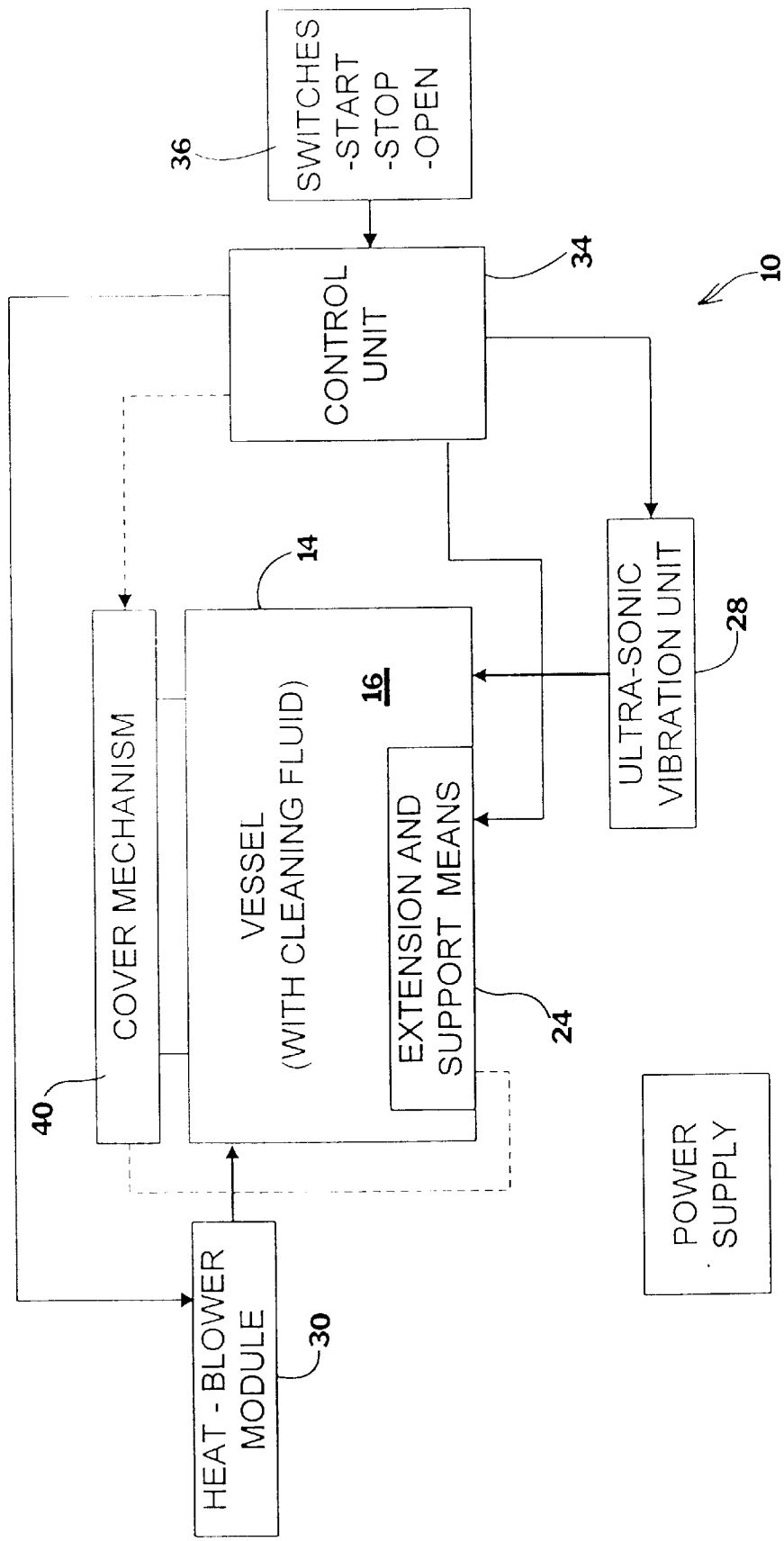
FIG. 4 provides a more detailed block diagram of the embodiment conceptually shown in FIG. 3.

FIGS. 3 and 4 provide block diagrams of preferred embodiments of the cleaning apparatus in accordance with the present invention. The conceptual block diagram of FIG. 3 broadly establishes the major components of the invention. These components are physically exemplified by the embodiments of FIGS. 1A, 1B, and 2. FIG. 4 provides a more detailed block diagram, illustrating the preferred embodiment a plurality of the interconnects possible between the various components.

As can be seen in the block diagrams of FIGS. 3 and 4 (and as clearly shown in FIG. 1B), the cleaning apparatus 10 may further include a cover mechanism 40. The cover mechanism 40 would be movable to a first open position and a second closed position. Consider for example a cover mechanism 40 comprising two hinged door 40a and 40b. In the open position, as shown in dotted lines in FIG. 2, the interior cavity 16 may be easily accessed to place or remove eyeglasses from the holder 24b. When in the closed position, shown as solid lines in FIG. 2, the interior cavity 16 is substantially sealed. It is contemplated the cover mechanism 40 may be operated (to open and close) by an actuator (not specifically shown) that is employed to extend and retract, respectively, the extension and support means 24. Alternately, a separate actuation means may be provided to position the cover mechanism in either the open or closed position. As is clearly seen in FIG. 1B, a plurality of elongated doors 40a and 40b may be mounted to the housing 12 via a plurality of hinge means 42, or equivalents.

In order to support the fully automated cleaning of eyeglasses in accordance with the present invention, a control unit 34 may be provided as an embedded computer module (e.g., a microprocessor or microcontroller based module) or a hardwired programmed logic module (e.g., employing CPLD or field programmable logic devices). Skilled persons may provide either of these versions of the control unit 34, or alternately other embodiments that are known in the art. The control unit 34 would be operatively coupled to each of the extension and support means 24, the vibration unit 28, and the heater/blower module 30 to enable the control of these components in an automated fashion. The control unit 34 may include one or more switches 36 to enable a user to start and stop the cleaning activities.

One exemplary operational embodiment contemplated for use with the cleaning apparatus 10 is provided as a flowchart in FIG. 5. The process may commence with a user depressing an open witch at 102. This causes the extension and support means 24 fully extend. The holder 24b, or an equivalent, is then positioned to accept the eyeglasses. At 104 the eyeglasses are placed into the holder 24b (or an equivalent). Next, at 108, the user may depress a close switch (which may be the open switch configured as an open-close switch), or take another equivalent action, to lower the eyeglasses into the volume of cleaning fluid 18 for cleaning. At 110 cleaning activities may commence with the activation of the vibration unit 28. If the user does not depress a stop switch at 112 to interrupt the cleaning (vibration) activities, the control unit 34 continues to energize the vibration unit for a predetermined, possibly user set, temporal period. Once the temporal period has expired, as determined at 114, the vibration unit 28 would be de-energized and the extension and support means 24 would raise the eyeglasses into a 'drying position' at 116. At 118 the heater-blower module 30 is energized and the glasses are dried. Once dried, say after another temporal period has expired, the extension and support means 24 is fully extended and the eyeglasses are raised to a point that a user may remove them from the holder 24b.

As skilled persons will appreciate, the cleaning apparatus 10 in accordance with the present invention may be physically embodied in a variety of forms. Those provided above are exemplary, possibly preferred embodiments. It is further contemplated that the operation of the invention as exemplified by the method of FIG. 5 may be altered to provide a number of equivalents. Accordingly, while there have been described the currently preferred embodiments of the invention, those skilled in the art will recognize that other and further modifications may be made without departing from the present invention, and it is intended to claim all modifications and variations as fall within the scope of the appended claims.

What is claimed is:

1. A fully automatic and compact apparatus for cleaning eyeglasses, comprising:

a) a housing having outer wall portions forming a shell; a cleaning vessel having side wall portions and a bottom wall portion that establish an interior cavity, which is appropriately sized to readily accept at least one pair of eyeglasses, the vessel having an open upper portion and disposed within the housing so that wall portions of the vessel are substantially coextending, but inwardly, radially spaced from the outer wall portions of the housing;

b) the housing joined to the vessel proximate to the open upper portion of the vessel so as to form an inner, possibly somewhat annular, substantially closed compartment that is formed in-between wall portions of the vessel and the housing;

c) extension and support means configured to hold and support the eyeglasses during cleaning activities, and is movable between an extended position and retracted position;

d) the extension and support means having a holder, which when in the extended position is located above an upper end of the housing to enable a user to readily place at least one pair of eyeglasses into said holder to be supported thereby during cleaning activities, and when in the retracted position the extension and support means places the eyeglasses within a volume of cleaning fluid contained within the vessel;

e) a vibration unit mechanically coupled to the vessel to cause the volume of cleaning fluid to be vibrated and agitated to effect cleaning of eyeglasses suspended therein;

f) a heater-blower module to produce a source of heated pressurized air within the closed compartment when activated; and g) a plurality of jets formed in upper side wall portions of the vessel that direct streams of pressurized heated air, produced by the heater-blower module, from the closed compartment into the interior cavity of the vessel to effect the blow-drying the eyeglasses when the extension and support means is in a suitable position in-between the extended position and retracted position, the suitable position locating the eyeglasses above a surface level of the volume of fluid, but within the vessel.

2. The cleaning apparatus according to claim 1, wherein the extension and support means includes a telescoping multi-sectioned extension arm that may be activated to raise and lower the holder and any eyeglasses supported therein.

3. The cleaning apparatus according to claim 2, further including a control unit operatively coupled to each of the extension and support means, to effect raising and retracting thereof, the vibration unit, to start and stop vibrating of the volume of fluid, and the heater-blower module, to control timing and duration of the blow-drying of the eyeglasses.

4. The cleaning apparatus according to claim 3 further including a plurality of user accessible and operable switches that enable the user to start and stop cleaning activities.

5. The cleaning apparatus according to claim 1, further including a cover mechanism that opens when the extension and support means assumes the extended position, and closes when the extension and support means assumes the retracted position.

6. The cleaning apparatus according to claim 5, wherein the cover mechanism includes two elongated cover portions that are coupled to the upper portion of the housing by a suitable hinge means.

7. The cleaning apparatus according to claim 5, wherein the vibration unit produces vibrations in an ultra-sonic frequency range.

8. The cleaning apparatus according to claim 5, wherein the inner compartment houses at least one of the vibration unit, the heater-blower module, the control unit, and user operated switches.

* * * * *